(No Model.)

L. W. MERRIAM.
WIRE SCREW.

No. 426,294. Patented Apr. 22, 1890.

Attest.
F. H. Schott
W. L. Boyden

Inventor
Lyman W. Merriam
per John C. Pasker Atty

UNITED STATES PATENT OFFICE.

LYMAN W. MERRIAM, OF FITCHBURG, MASSACHUSETTS.

WIRE SCREW.

SPECIFICATION forming part of Letters Patent No. 426,294, dated April 22, 1890.

Application filed October 19, 1889. Serial No. 327,515. (No model.)

*To all whom it may concern:*

Be it known that I, LYMAN W. MERRIAM, a citizen of the United States, residing at Fitchburg, in the county of Worcester and State of Massachusetts, have invented certain new and useful Improvements in Wire Screws; and I do hereby declare the following to be a full, clear, and exact description of the invention, such as will enable others skilled in the art to which it appertains to make and use the same.

This invention relates to an improvement in the construction of wire screws, such as are ordinarily formed out of a single piece of wire, one end of which forms the threaded shank or stem while the other end is bent into a circular form to afford a head or eye.

The object of the invention is to facilitate the connection of a wire screw of the kind just referred to with a bolt or other projecting device for various purposes; and the invention consists, essentially, in a wire screw having a head or eye provided with a notch, depression, or recess fashioned in the metallic rim of said head; and furthermore, the invention consists in the construction and combination, substantially as will be hereinafter described and claimed.

Figure 1:
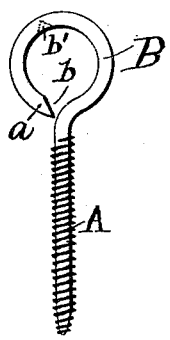
Figure 2:
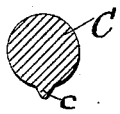

In the accompanying drawings, illustrating my invention, Figure 1 is a plan view of my improved wire screw, showing the slot or notch in the eye thereof. Fig. 2 represents one form of bolt having a lug thereon, adapted to pass through the slotted eye of the screw.

Like letters of reference denote like parts.

A denotes the threaded stem of a wire screw, and B the circular head or eye integral with the stem and bent in such a manner that the end $a$ of the wire which forms the head comes into close proximity to the wire which forms the screw-stem. The end $a$ of the wire which forms the head or eye of the screw is beveled at a suitable angle, as shown, so that between said wire end and the stem is formed a notch, or slot, or opening adapted to permit the passage therethrough of the lug formed on a bolt or any other device which may pass through the said screw-eye for any desired purpose. In Fig. 2 I have shown an example of such a bolt, in which C indicates the said bolt, having a lug $c$ on the side thereof. The extent of bevel of the wire end $a$ may be adjusted in different cases as desired, so as to make the slot or notch $b$ of the proper size for the object in view.

Instead of beveling the end of the wire $a$ in order to form the notch or slot, a V-shaped cut may be made in the wire ring B at any desired point thereof, as, for instance, at the point $b'$.

Certain changes may be made in the form of the screw, its eye, and the slot therein, to adapt the said screw for various purposes without departing from the spirit or scope of the present invention, and I do not intend to be restricted to the precise structure herein described.

Having thus described my invention, what I claim as new, and desire to secure by Letters Patent, is—

1. As a new and improved article of manufacture, the herein-described screw having a circular eye provided with an internal notch or opening, substantially as described.

2. As a new article of manufacture, the herein-described screw, consisting of the threaded stem and the circular head or eye having a notch formed at a point therein, as set forth.

3. The herein-described improved wire screw, consisting of the stem, the circular eye, the wire of which has a beveled end and the slot or opening formed between said beveled end and the stem, substantially as set forth.

In testimony whereof I affix my signature in presence of two witnesses.

LYMAN W. MERRIAM.

Witnesses:
STILLMAN HAYNES,
ASA S. LAWTON.